United States Patent [19]

Niinivaara et al.

[11] Patent Number: 4,780,944

[45] Date of Patent: Nov. 1, 1988

[54] METHOD AND TOOL FOR THE FREEING OF PARTS HELD FAST TOGETHER

[75] Inventors: Juhani Niinivaara, Koria; Hannu Makelainen, Rovaniemi, both of Finland

[73] Assignee: Oy Gss General Sea Safety Ltd., Helsinki, Finland

[21] Appl. No.: 865,729

[22] PCT Filed: Sep. 18, 1985

[86] PCT No.: PCT/FI85/00077

§ 371 Date: Jun. 30, 1986

§ 102(e) Date: Jun. 30, 1986

[87] PCT Pub. No.: WO86/01765

PCT Pub. Date: Mar. 27, 1986

[30] Foreign Application Priority Data

Sep. 18, 1984 [FI] Finland ................................ 843634

[51] Int. Cl.[4] ........................ B23P 19/00; B23P 19/02

[52] U.S. Cl. ................................ 29/426.3; 29/426.4; 219/70

[58] Field of Search ........................ 219/68, 69 R, 70; 29/426.4, 426.5

[56] References Cited

U.S. PATENT DOCUMENTS

| | | | |
|---|---|---|---|
| 1,436,557 | 11/1922 | Wysong | 219/70 |
| 2,436,251 | 2/1948 | Dobie et al. | 29/426.4 |
| 2,588,744 | 3/1952 | McKechnie | 219/69 R |
| 2,773,968 | 12/1956 | Martellotti et al. | 219/69 R |
| 3,231,972 | 2/1966 | Annese et al. | 29/426.4 |
| 3,541,291 | 11/1970 | Johanson | 219/69 R |
| 4,255,642 | 3/1981 | Livera | 219/68 |
| 4,538,043 | 8/1985 | Alexander | 219/68 |

*Primary Examiner*—Timothy V. Eley

*Attorney, Agent, or Firm*—Webb, Burden, Ziesenheim & Webb

[57] ABSTRACT

A method and a tool for freeing of parts held fast, especially for freeing of bolts and nuts rusted fast under water. According to the invention an electric arc is created between the rotating endpiece (21) of the tool and the fast held part (1), with which the fast held part is heated and/or thermally cut, after which the fast held part can be freed from the fastened object.

8 Claims, 1 Drawing Sheet

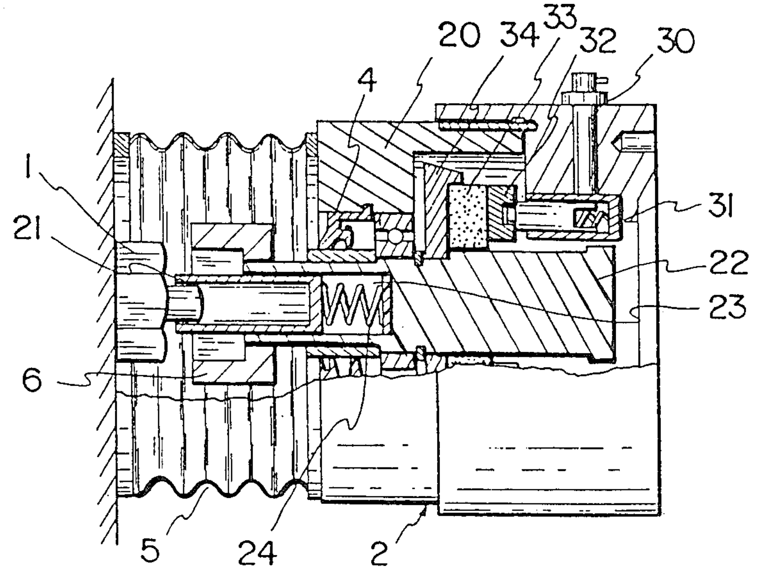
20
34
33
32
30
4
1
21
31
22
23
6
5
24
2

METHOD AND TOOL FOR THE FREEING OF PARTS HELD FAST TOGETHER

The object of this invention is to provide a method and a tool for the freeing of parts held fast together, especially for the freeing of rusted bolts and nuts.

According to prevailing current practice percussion wrenches or hydraulic tools are used for the freeing of rusted nuts. Among the drawbacks of such solutions it must be mentioned that the work is physically arduous and that at every moment there is the danger of industrial accident. Particularly awkward in the freeing of rusted nuts is the long-established additional use of heat, such as the use of gas welding equipment.

Among the disadvantages of such heating method must be mentioned that the gas bottles and pipes must be conveyed ot the object to be freed which is often located in sites that are difficult to reach and even hazardous. Naturally this is especially undesirable and time-consuming. It must be further mentioned as a drawback connected with the use of gas welding equipment that in the heating of larger nuts in difficult places the flame may become excessive which can damage the flanged or machined surfaces.

The objective of this invention here presented is to eliminate suchlike shortcomings and drawbacks of the long-established freeing methods. This objective is achieved with the method according to the invention in which the electrically conducting endpiece of the tool is pressed against the part that is held fast together, an electrical potential difference is created between the fast-held part and the endpiece which induces an electric arc and with the thermal energy generated by the arc the fast-held part is heated and thermally cut, after which it is freed from its fastening point, and by the tool according to the invention, having a body part fitted with an electrically conducting, detachable and advantageously sprung endpiece and equipped for the conduction of electrical current to the endpiece for the formation of an electrical arc.

An advantage of the invention which must be mentioned is that the physical accomplishment of freeing is accelerated, which significantly shortens the working time taken by the freeing operation. Further it must be realised that a gas flame is not needed at all, so that the freeing operation can be accomplished without difficulty in connection with various cast constructions and in machine repairs. In accordance with the invention heat does not rise too high so that fire-and metallic damage are avoided. It must be held as an especially significant advantage that working in fire and explosion-hazard sites is safe and also that freeing work can be performed in underwater circumstances.

Certain advantageous modes of application of the invention are described in the following with the aid of reference to the accompanying drawing, which depicts the tool for freeing parts held fast together according to the invention, in part cross section as seen from the side.

As is evident from the drawing the freeing tool according to the invention comprises a rotated, electrically conducting and spring-loaded endpiece 21 and means for the conduction of electricity to the aforementioned end piece 21. Both endpiece 21 and the electricity-conducting equipment to it are fitted to advantage to the tool body part 20.

Use of the tool according to the invention, in freeing the fast-bound part 1, especially a rust-bound nut, takes place as follows: first the electrically-conducting endpiece is pressed against the nut to be freed, after which an electrical potential difference is created between the nut and endpiece, which induces arcing from endpiece 21 to nut 1, which arc in developing thermal energy heats the nut 1. which due to thermal expansion expands, which makes possible freeing of the nut.

In accordance with an advantageous application mode of the method according to the invention the endpiece 21 is essentially rotated throughout the heating stage, when in addition to heating of the nut, thermal cutting of nut 1 is possible. It is then advantageous that the endpiece 21 be formed at its end as an open hollow part and manufactured from melting material, prevailingly of thermitic substance. In this connection there is reason to emphasize that, as is clear to the expert in the welding field, the heating or thermal cutting temperature to be reached can be decisively effected by material selection.

In using the aforementioned hollow part as endpiece 21 and by measuring the thread of the corresponding nut to be freed the threads of the fast-bound nut 1 can be burnt away without difficulty by thermal action. Since the endpiece 21 is rotated continuously throughout the heating or thermal cutting stage it removes the melt material between the endpiece 21 and the nut 1 all the time as the result of the rotational movement. After the thread has been burnt away the nut may be simply pulled free from the bolt or some other fastening device of its kind.

One of the advantageous modes of application of the tool 2 according to the invention is so constructed that inside the cylindrical body part 20 is a shaft 22, concentrically rotating in bearings. in the end of which is a hollow space 23, the inside of which is arranged to be locked for rotation with shaft 22, the detachable endpiece 21 and the endpiece 21 spring-loading device 24, advantageously with a spiral spring, which at one end engages the end of the aforementioned hollow space 23 and at the other end bears against the endpiece 21.

For the rotation of shaft 22 and the endpiece to be rotated with it, any driving device that is considered suitable may be used (not illustrated in the diagram) which can be mounted for example with a flange connection to the other end of shaft 22. Suitable power units for the application are, for example, various electical, hydraulic, pneumatic or mechanical rotating devices.

As has already been established, endpiece 21 is of electrically conducting material, advantageously of thermitic material self-combustible on attainment of a known temperature. In order that vibrations can be minimised and that the compressive force and the arc between nut 1 and the endpiece will remain as stable as possible, the endpiece 21 is spring-loaded, so that the spring 24 continually presses the endpiece upwards from the hollow space 23.

It is not essential from the invention standpoint how the endpiece 21 is held for its movement in the axial direction and for its rotation with shaft 22 in the hollow space 23. Such constructions are fully within the capabilities of any professional person and cause no difficulty. There is however cause to observe that from the point of view of trouble-free use of tools it is advantageous that suitable quick-locking elements be used between the hollow space 23 and the endpiece 21. As suitable elements for this purpose flexible clip elements could be used, which being fastened to the enclosing walls of hollow space 23 press against the outer circumference of the stem part of endpiece 21 thrust into hollow space 23, advantageously into a groove formed therein. As a merit of the quick-locking device the endpiece 21 of tool 2 can be rapidly exchanged for another.

For the thermal cutting of the threaded portion of nut 1 or corresponding part the endpiece 21 is shaped as a hollow part, most advantageously as a cup shape. The endpiece 21 can also be made from a pipe or tubular shape having open ends (not shown). In such an alternative embodiment, the spiral spring 24 is fitted with a thin plate of metal to bear against the lower end of the tubular endpiece to provide the necessary biasing force and the required electrical conduction therebetween.

The diameter for the periphery of the hollow endpiece which is pressed against the nut to be removed (1) is selected to correspond with the thread diameter of the nut (1) to be freed, for thermally cutting away the threaded portion. Since the size of the nut 1 to be removed commonly varies within wide limits it is, from the point of view of work flow, advantageous that the tool according to the invention can be connected to endpieces 21 of various diametral dimensions. For the attainment of this objective the stem part of endpiece 21 is of constant dimension and form for fitting into the hollow space 23 of all tool 2 body parts 20 and the end part projecting from the hollow space 23 for its part varies in progressive sizes within wide limits, whereupon the endpieces 21 make up a so-named freeing pieces set, from which is found a suitable freeing endpiece 21 for each nut size. According to one of the advantageous modes of the invention both the hollow space 23 and inner portion or stem part of the endpiece 21 are polygonal in cross section and the outer part of endpiece 21 protruding from the hollow space 23 is cylindrical.

In addition to freeing of nuts 1 the tool according to the invention can also be used for the heating of large metal plates in the shipbuilding industry. For this purpose a modified end piece 21 is employed, which is enlarged from hollow space 23 outwardly in a bowl-like form.

In the exemplary circumstances according to the drawing the equipment to lead electricity to the endpiece 21 includes connector 30, to which the current coming from a transformer is run by means of cables. The connector 30 is connected to the electrically conducting supply ring 31, which is concentrically fitted around the shaft 22 and from which the slide ring 32, brush 33 and brush flange 34, which being in contact with shaft 22, lead electrical current to shaft 22. Electrical current is thus present in the sidewall and floor surrounding the hollow space 23 to electrically conduct to the spring 24 and thence to the endpiece 21. In this manner endpiece 21 rotates together with the shaft 22 and is electrically coupled thereto.

According to one advantageous mode of application of the invention, the hollow space 23 is fitted with an electrically conducting fluid medium, advantageously mercury, electrical current being conducted by this means from the shaft 22 to the endpiece 21. To ensure the retention of mercury in the hollow space 23 and for example, for making possible the use of the tool under water, the adaptor between the endpiece 21 and the hollow space 23 is tight and possibly additionally furnished with a seal. In addition an insulation sheet is installed in hollow space 23 between the base of the hollow space 23 and the spiral spring 24 to control the electrical current supply and prevent return of the spiral spring.

For prevention of the entry of foreign bodies and also for making possible the use of tool 2 under water, the space between body part 20 and shaft 22 is furnished with the lipped seal 4. Especially for the control of work in fire hazard areas the bellows pipe 5 is fitted to the end of the body part 20 on the endpiece 21 side, which encloses the endpiece 21 and the nut to be freed 1, when the endpiece 21 is used to advantage with fluid filling the inside of bellows pipe 5.

A further preferred embodiment of the invention includes the use of a rotatable socket 6 detachably fitted to the rotating shaft 22 in which the nut 1 is first loosened by electrical heating with the endpiece 21. After the temperature has risen sufficiently, the electrical current is cut off and tool 2 is thrust progressively deeper towards nut 1 which causes the socket 6 also to move toward the nut 1. After the socket 6 is moved into engagement with the nut 1, the socket is rotated and the nut can be released. The socket 6 is stocked in different sizes in order that there are suitably sized sockets on hand to fit the variety of nut sizes which are usually encountered.

The invention has heretofore only been described with the aid of some of its advantageous modes of application. It was naturally not in any way desired here to limit the invention as the invention can be varied very considerably in its detailed features within the enclosed patent claims in the framework of the specified inventive concept.

Separately there is cause to further emphasize the special features connected with this invention in that by changing the direction of rotation of shaft 22 the tool can be used as a nut or bolt tightening unit. In addition by changing the endpiece material the tool can be used as a weld joining device. For example, a conically shaped element may be used as an endpiece which is welded to the basic material or plate through which a matching conically shaped hole has been previously formed.

I claim:

1. A method for the freeing of fast-held parts, such as between the threaded shanks of bolts and nuts, or similar objects, with the aid of a tool comprising pressing an electrical conducting cup-like hollow endpiece of a tool against and around the part that is held fast, inducing an arc between the fast-held part and the endpiece to create thermal energy to heat and/or thermally cut the fast-held part, rotating the endpiece so that the arc is continuous and peripheral to the threaded shank of the fast-held part, removing molten material formed between the endpiece and the fast-held part by said rotational movement.

2. A tool for the freeing of fast-held parts, such as nuts, bolts and similar objects, comprising a body part, a rotatable shaft mounted in the body part, said rotatable shaft having a hollow space, a spring in said hollow space bearing against an end wall of the hollow space, an endpiece in the hollow space abutting at a first end against the spring, said endpiece having at a second end an open hollow part, means for rotating the endpiece in the body part, means for providing an electrical current to the endpiece for the formation of an electrical arc between the endpiece and the fast-held part.

3. A tool according to claim 1, including a plurality of detachable endpieces to make up a set of freeing and/or tightening endpieces for nut or bolt of varying sizes, in which each endpiece of the set has a stem part of constant dimension, the shape of which corresponds to the shape of the hollow space.

4. A tool according to claim 2 in which the means for providing the electrical current to the endpiece is arranged to lead the electrical current through the shaft to the hollow space.

5. A tool according to claim 4, in which the hollow space is filled with an electrically conducting medium.

6. A tool according to claim 2 in which a bellows pipe is fastened to the end of the body part surrounding the endpiece.

7. A tool according to claim 2 in which a detachable socket is fitted to rotate with the shaft for the freeing of the heated nut or bolt.

8. A tool according to claim 2, in which the endpiece is cup-like.

* * * * *